US010392127B2

(12) United States Patent
Kruckenberg et al.

(10) Patent No.: US 10,392,127 B2
(45) Date of Patent: Aug. 27, 2019

(54) LIGHTNING STRIKE PROTECTION FOR COMPOSITE COMPONENTS

(71) Applicant: ROHR, INC., Chula Vista, CA (US)

(72) Inventors: Teresa M. Kruckenberg, La Mesa, CA (US); Vijay V. Pujar, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 15/802,558

(22) Filed: Nov. 3, 2017

(65) Prior Publication Data

US 2018/0065758 A1 Mar. 8, 2018

Related U.S. Application Data

(62) Division of application No. 14/261,880, filed on Apr. 25, 2014, now Pat. No. 9,834,318.

(51) Int. Cl.

| | |
|---|---|
| ***B64D 45/02*** | (2006.01) |
| ***H01B 1/04*** | (2006.01) |
| ***B82Y 30/00*** | (2011.01) |
| ***C08J 5/00*** | (2006.01) |
| ***C08J 5/04*** | (2006.01) |
| ***C08J 5/06*** | (2006.01) |

(52) U.S. Cl.
CPC .............. *B64D 45/02* (2013.01); *C08J 5/005* (2013.01); *C08J 5/042* (2013.01); *C08J 5/06* (2013.01)

(58) Field of Classification Search
CPC ............ H01B 1/04; H01B 1/24; B64D 45/02; B82Y 30/00; C08J 5/042; C08J 5/06; C08J 5/05
USPC .......... 252/74, 510, 500, 511; 977/762, 764; 423/445 R, 448, 460
See application file for complete search history.

(56) References Cited

U.S. PATENT DOCUMENTS

| | | | |
|---|---|---|---|
| 8,999,453 | B2 | 4/2015 | Shah et al. |
| 2009/0176112 | A1 | 7/2009 | Kruckenberg et al. |
| 2009/0227162 | A1 | 9/2009 | Kruckenberg et al. |
| 2010/0224129 | A1 | 9/2010 | Malecki et al. |
| 2010/0270069 | A1 | 10/2010 | Shar et al. |

(Continued)

FOREIGN PATENT DOCUMENTS

| | | |
|---|---|---|
| EP | 2289803 | 3/2011 |
| WO | 2007130979 | 11/2007 |
| WO | 2011063423 | 5/2011 |

OTHER PUBLICATIONS

Samsur ("Fabrication of carbon nanotubes grown woven carbon fiber/epoxy composites and their electrical and mechanical properties." Journal of Applied Physics 113, 214903) (Year: 2013).*

(Continued)

*Primary Examiner* — Tri V Nguyen
(74) *Attorney, Agent, or Firm* — Snell & Wilmer, L.L.P.

(57) ABSTRACT

Systems and methods for lightning strike materials are disclosed. The material may include a carbon fiber tow. Carbon nanotubes may be grown on carbon fibers within the carbon fiber tow. The carbon nanotubes may cause the carbon fibers to separate, decreasing a carbon tow fiber volume fraction of the tow. The growth of the carbon nanotubes may be controlled to select a tow fiber volume fraction of the tow. The lightning strike material may transmit electricity to decrease damage to the composite structure in case of a lightning strike.

13 Claims, 5 Drawing Sheets

(56) References Cited

U.S. PATENT DOCUMENTS

| | | | |
|---|---|---|---|
| 2011/0049292 | A1 | 3/2011 | Kruckenberg et al. |
| 2014/0011414 | A1 | 1/2014 | Kruckenberg et al. |
| 2014/0356613 | A1 | 12/2014 | Weisenberger |

OTHER PUBLICATIONS

Jagannathan "Structure and electrochemical properties of activated polyacrylonitrile based carbon fibers containing carbon nanotubes" Journal of Power Sources 185 (2008) 676-684 (Year: 2008).*

European Patent Office, European Office Action dated Jun. 15, 2018 in Application No. 15164375.6-1102.

Extended European Search Report dated Sep. 22, 2015 in European Application No. 15164375.6.

USPTO; Non-Final Office Action dated Dec. 10, 2015 in U.S. Appl. No. 14/261,880.

USPTO; Final Office Action dated May 19, 2016 in U.S. Appl. No. 14/261,880.

USPTO; Advisory Action dated Aug. 4, 2016 in U.S. Appl. No. 14/261,880.

USPTO; Non-Final Office Action dated Mar. 2, 2017 in U.S. Appl. No. 14/261,880.

USPTO; Notice of Allowance dated Aug. 4, 2017 in U.S. Appl. No. 14/261,880.

Lomov et al., "Compressibility of Carbon Woven Fabrics with Carbon Nanotubes/ Nanofibres Grown on the Fibres", Composite Science and Technology 71, Published Nov. 30, 2010, pp. 315-325.

Garcia et al., "Fabrication and Multifunctional Properties of a Hybrid Laminate with Aligned Carbon Nanotubes Grown in Situ", Composite Science and Technology 68, Published Mar. 7, 2008, pp. 2034-2041.

Mathur et al., "Growth of Carbon Nanotubes on Carbon Fibre Substrates to Produce Hybrid/ Phenolic Composite with Improved Mechanical Properties", Composite Science and Technology 68, Available Online Mar. 4, 2008, p. 1608-1615.

* cited by examiner

LIGHTNING STRIKE PROTECTION FOR COMPOSITE COMPONENTS

CROSS REFERENCE TO RELATED APPLICATION FIELD

This application is a divisional of, claims priority to and the benefit of, U.S. patent application Ser. No. 14/261,880 filed on Apr. 25, 2014 and entitled "LIGHTNING STRIKE PROTECTION FOR COMPOSITE COMPONENTS", which is hereby incorporated by reference in its entirety.

FIELD

The technical field relates to aircraft and aircraft components, and more particularly relates to lightning strike protection materials for composite aircraft components and other composite structures.

BACKGROUND

The outer surfaces of aircraft components such as fuselages, wings, tail fins, engine nacelles, and the like, are typically constructed from non-metal composite materials, aluminum, or hybrid materials that include a combination of composite materials and metal. When lightning strikes a metal outer skin of an aircraft, the metal skin provides a highly conductive path that permits an electrical current to pass across the metal skin from a lightning strike point to a lightning exit point without substantial damage to the surface of the aircraft. Many modern aircraft components such as engine nacelles, however, are constructed of strong but light-weight composite materials that help to minimize the overall weight of the aircraft. These composite materials often comprise carbon or graphite reinforcement fibers distributed within a polymeric matrix. Such composite structures typically are substantially less electrically conductive than metal structures, and without modification would be less capable of conducting electrical energy resulting from a lightning strike. Accordingly, external surfaces of such composite aircraft components often include lightning strike protection that provides a highly conductive electrical path along their external surfaces. Such a conductive path permits the electrical energy associated with a lightning strike to be safely conducted across the protected surface from the lightning strike point to the lightning exit point, which helps minimize damage to the component.

Current lightning strike protection systems for non-metal composite aircraft structures typically comprise a lightning strike protection surface film that includes a metal foil or mesh that is disposed on or proximate to an external surface of the composite structure to facilitate the distribution and dissipation of electrical energy generated by a lightning strike on the protected surface. For example, a metal foil or mesh can be embedded within a thin layer of a polymeric material that is disposed on a surface of a composite structure.

SUMMARY

A fiber reinforced composite structure comprising a composite ply, wherein the composite ply comprises a fiber tow in a resin matrix is disclosed. The fiber tow may comprise a plurality of fibers and carbon nanotubes grown on the plurality of fibers. The carbon nanotubes may be located in an intratow region between the plurality of the fibers. The fiber tow may comprise a tow fiber volume fraction of less than 45%.

A method of manufacturing a composite material is disclosed. The method may comprise growing carbon nanotubes on fibers in an intratow region within a fiber tow. The method may further comprise controlling growth of the carbon nanotubes to reach a selected tow fiber volume fraction that is substantially uniform throughout the fiber tow.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
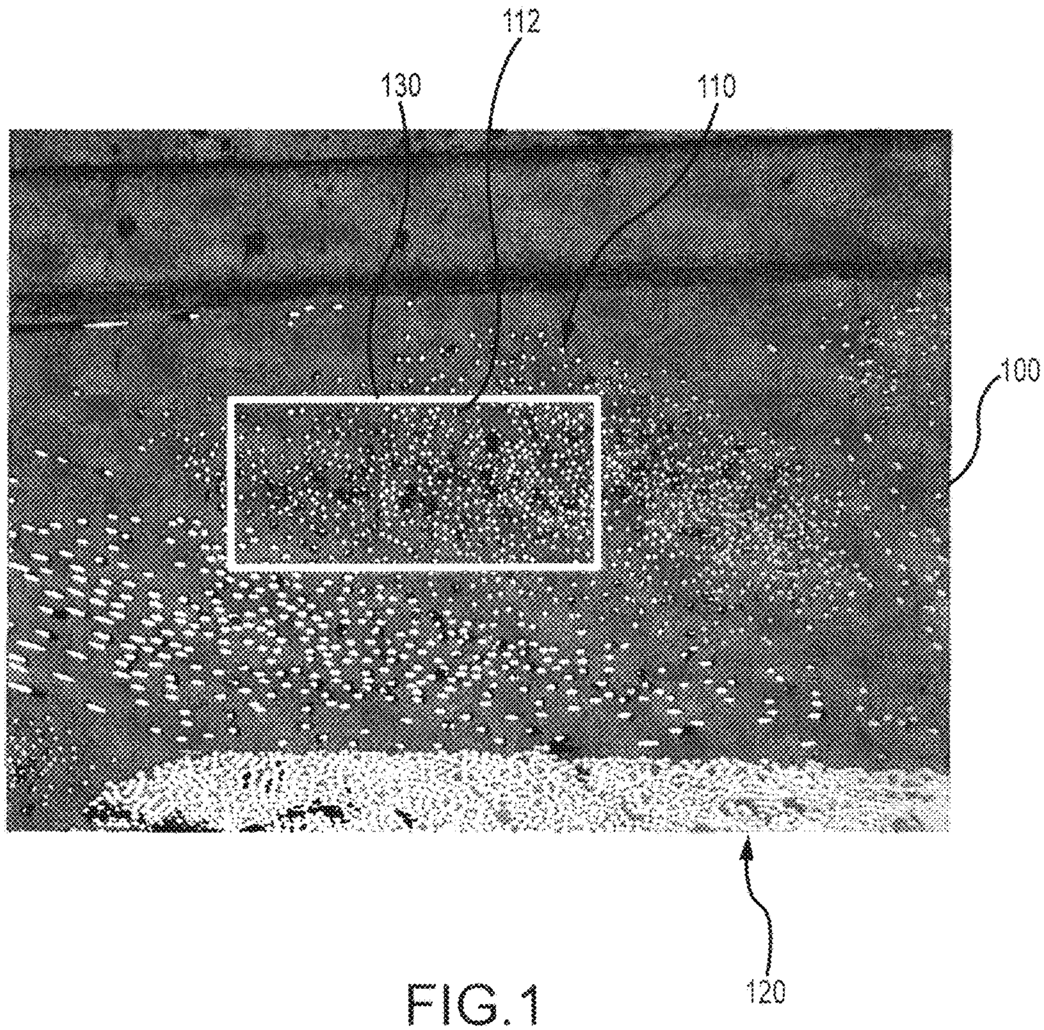
FIG. 1 illustrates a cross-sectional view of a lightning strike protection film in accordance with various embodiments of the disclosure.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, a surface film for lightning strike protection is disposed on or proximate to an external surface of an aircraft component. As used herein, the phrase "proximate to" means at or near a surface, wherein a film disposed proximate to a surface is located at or near the surface. In various embodiments, an electrically conductive surface film is not more than about 0.5 millimeter (mm) from the external surface of the structure. The surface film can include a substrate having a plurality of carbon nanotubes ("CNTs") grown on the substrate. The surface film can include a substrate having a plurality of carbon nanotubes grown on the substrate, where the carbon nanotubes can be single wall carbon nanotubes (SWCNTs), double wall carbon nanotubes (DWCNTs), multiwall carbon nanotubes (MWCNTs), or any combination thereof. Alternatively, the carbon nanotubes may be substituted by, or combined with, carbon nanofibers (CNFs). Hereinafter the terms "CNTs" and "carbon nanotubes" are meant to include carbon nanotubes, carbon nanofibers and combinations of carbon nanotubes and carbon nanofibers, and the terms "grown-on CNTs" and "grown-on carbon nanotubes" are meant to include carbon nanotubes, carbon nanofibers and combinations of carbon nanotubes and carbon nanofibers grown on the substrate. Preferably, the substrate is constructed of materials that have relatively low electrical resistivities. Alternatively, substrates that have relatively high electrical resistivities may be used in certain applications where lesser degrees of lightning strike protection are adequate. The substrate and grown-on CNTs combine to form a substantially flexible and electrically conductive preform. As used herein, the term "preform" refers to a substrate with a plurality of CNTs grown on the substrate.

Various methods of growing CNTs on the substrate can include functionalizing the surface of the substrate by exposing the surface to an oxidizing gas, and then forming catalysts on the surface of the substrate by immersing the substrate in a catalyst solution. In various embodiments, catalysts can be formed on the surface by subjecting the substrate to electrodeposition. Chemical vapor deposition can then be used to facilitate the growth of the CNTs on the surface of the substrate. When electrodeposition is used to form the catalysts on the substrate, the process can include a reductant such as sodium hypophosphite, for example. The oxidizing gas can be selected from ozone, carbon dioxide, and mixtures thereof, for example. The substrate can be exposed to the oxidizing gas at a temperature of between about 100° C. and 900° C. Where the oxidizing gas comprises ozone, the substrate can be exposed at a temperature of between about 100° C. and about 200° C., and where the oxidizing gas comprises carbon dioxide, the substrate can be exposed at a temperature of between about 400° C. and about 900° C. The catalyst solution can include a water or alcohol solution and soluble salts selected from salts of iron, molybdenum, nickel, cobalt, and combinations thereof, for example. The substrate can be dried after immersing the substrate in the solution and before subjecting the substrate to chemical vapor deposition to form the CNTs. Chemical vapor deposition can take place at a temperature between about 600° C. and about 900° C., and can utilize a hydrocarbon gas selected from acetylene, ethylene, methane, and combinations thereof. The properties of the CNTs grown on the substrate can be closely controlled by controlling the reaction time during chemical vapor deposition. The aforementioned process may yield preforms comprising a substrate with grown-on CNTs that are substantially uniformly distributed over the surfaces of the substrate such that the grown-on CNTs form a substantially continuous network of CNTs that is coextensive with the substrate. In various embodiments, a substantial portion of the grown-on CNTs touch or are within about 5 microns of at least one other grown-on CNT. In various embodiments, at least about 75 percent of the grown-on CNTs can touch or be within about 5 microns of at least one other grown-on CNT.

Each of the grown-on CNTs can include a first end that, for substantially each CNT, is attached to at least a portion of the substrate, and an opposed second end that generally extends away from the first end and the substrate. The CNTs can be generally straight or can have a generally helical shape or another shape. The lengths of the grown-on CNTs can be from about 2 microns to about 100 microns, and the diameters of the grown-on CNTs can be from about 1 nanometer (nm) to about 200 nm. In various embodiments, CNTs on a first carbon fiber may contact and push against CNTs on an adjacent second carbon fiber as the CNTs are grown. This may cause the adjacent carbon fibers move apart from one another. The morphology of the grown-on CNTs can vary from bulky and entangled, to loose bundles, to random and helical. In various embodiments, the preform comprising the substrate with grown-on CNTs is sufficiently flexible to conform to a curved surface like that commonly found on exterior surfaces of an aircraft (including its various components).

In various embodiments, the preform can be embedded within a polymeric resin to form a lightning strike protection surface film. When cured, the polymeric resin binds the preform constituents, namely the substrate and the grown-on CNTs, in a fixed position on or proximate to a surface of a component or structure. In various embodiments, the preform can be impregnated with an epoxy or thermoplastic resin of a type commonly used to fabricate composite aircraft structures, and the resulting surface film can be incorporated on or adjacent to the surface of a composite structure during lay up of the composite structure using fabrication methods known in the art. In various embodiments, the preform is positioned within about 0.5 mm of the protected external surface of the composite structure. If the external surface of the composite structure is to be painted in order to provide the surface with a smooth and aesthetically pleasing appearance, the preform can be located within about 0.5 mm (or less) of the surface before paint is applied to the surface. The surface film can be cured together with other portions of the composite structure using known methods such that the surface film is disposed on or proximate to an external surface of the cured structure. In various embodiments, the preform can be infused or impregnated with a polymeric resin, the resin can be cured to form a durable sheet or film, and the sheet or film can be bonded onto an external surface of an aircraft component for lightning strike protection. For example, the preform can be embedded within an epoxy or a polyurethane film, and the resulting flexible surface film can be bonded to an external surface of a composite structure with an adhesive or the like. After bonding, the preform is located proximate to an outermost surface of the structure. In various embodiments, the fiber surfaces of the substrate may be sized with a compatible material before embedding the preform within a polymeric film. The sizing helps keep the grown-on CNTs attached to the substrate during shipment or handling and/or promotes bonding during fabrication.

In various embodiments, the substrate can be a braided fabric, woven fabric, or non-crimp fabric constructed of tows formed of electrically conductive fibers. The structure of the fabric substrate can be substantially similar to braided, woven or non-crimp fabric commonly used as reinforcements in composite aircraft structures, for example. The electrically conductive fibers can be carbon fibers (such as standard modulus carbon fibers, high modulus carbon fibers, heat treated carbon fibers, metal coated carbon fibers, and the like), or can be CNT reinforced polyacrylonitrile (PAN) carbonized fibers (CNTs within the PAN fibers). The invention is not limited to carbon fibers, and can be applied to other electrically conductive fibers known to those skilled in the art, for example silicon carbide fibers. The substrate and the grown-on CNTs provide an electrically conductive preform for use in providing lightning strike protection to an external surface of a composite structure, such as a composite aircraft structure. In various embodiments, non-conductive fibers, such as glass fibers, may be used for growing the CNTs. The grown-on CNTs may provide an electrically conductive preform such that the electrical conductivity from the connected network of CNTs may be sufficient for use in providing lightning strike protection to an external surface of the composite structure. The CNTs may be configured to transmit electrical or thermal energy from a lightning strike.

In various embodiments, the substrate may comprise carbon fibers arranged in a tow. A tow may comprise a bundle of carbon fibers. In various embodiments, the number of carbon fibers in a tow may be on the order of hundreds or thousands of parallel carbon fibers packed together. During growth of CNTs, the CNTs may be grown on an external surface of the tow, as well as in an intratow region between the carbon fibers within the tow. As CNTs grow between the carbon fibers, the CNTs may push against each other, forcing the carbon fibers to separate, and increasing a volume of the tow. The CNTs between the carbon fibers may form a conductive path for electricity from a lightning strike.

Referring to FIG. 1, a cross-sectional view of a cured composite showing lightning strike protection film 100 is illustrated according to various embodiments. Lightning strike protection film 100 may comprise a tow 110. Tow 110 is illustrated in the zero degree direction. The zero degree direction refers to a tow that is normal to the plane of the image, such that a cross-section of each carbon fiber 112 in the tow is represented by a circle in FIG. 1.

A tow fiber volume fraction of the tow 110, defined as the volume of carbon fibers in a tow divided by the total volume of the tow 110, may be measured by computer analysis. An image of the tow 110 in the zero degree direction, such as the image shown in FIG. 1 may be captured. A representative section 130 of the tow 110 may be analyzed by a contrast program. The contrast program may measure the area of white circles representing carbon fibers 112, and divide the area of the carbon fibers by the total area of the section 130 in order to calculate the tow fiber volume fraction of the tow. As illustrated in FIG. 1, tow 110 may comprise a tow fiber volume fraction of approximately 20%. The tow fiber volume fraction may be a function of the amount of CNTs grown in an intratow region between carbon fibers 112, because the CNTs may push the carbon fibers 112 apart, thus increasing the volume of the tow 110 and decreasing the tow fiber volume fraction of the tow 110.

In contrast to tow 110, tow 120 may comprise a relatively high tow fiber volume fraction. This is visible as the carbon fibers 122 are densely packed together. The high tow fiber volume fraction may indicate that few or no CNTs are present between carbon fibers 122.

In experimentation, damage from test lightning strikes was measured based on many variables. Some of the variables included surface film resistance, the percentage of CNT weight of the surface film, and tow fiber volume fraction. It was determined that, for a given weight fraction of CNTs per unit weight of fiber substrate, lower tow fiber volume fractions (representing more CNTs grown between carbon fibers) correlated to less damage from test lightning strikes. As tow fiber volume fractions decrease below 10% and approach 5%, the volume of the tow may become too large to adequately fit within a surface film. Additionally, although the lower tow volume fractions may result in lower electrical resistance, tow fiber volume fractions lower than 5% may provide only incremental benefit in lessening damage from lightning strikes. Thus, tow fiber volume fractions of less than 45%, such as between 10%-20%, or in various embodiments between 5%-40% were determined to adequately prevent damage from lightning strikes while balancing cost and manufacturing obstacles.

Figure 2:
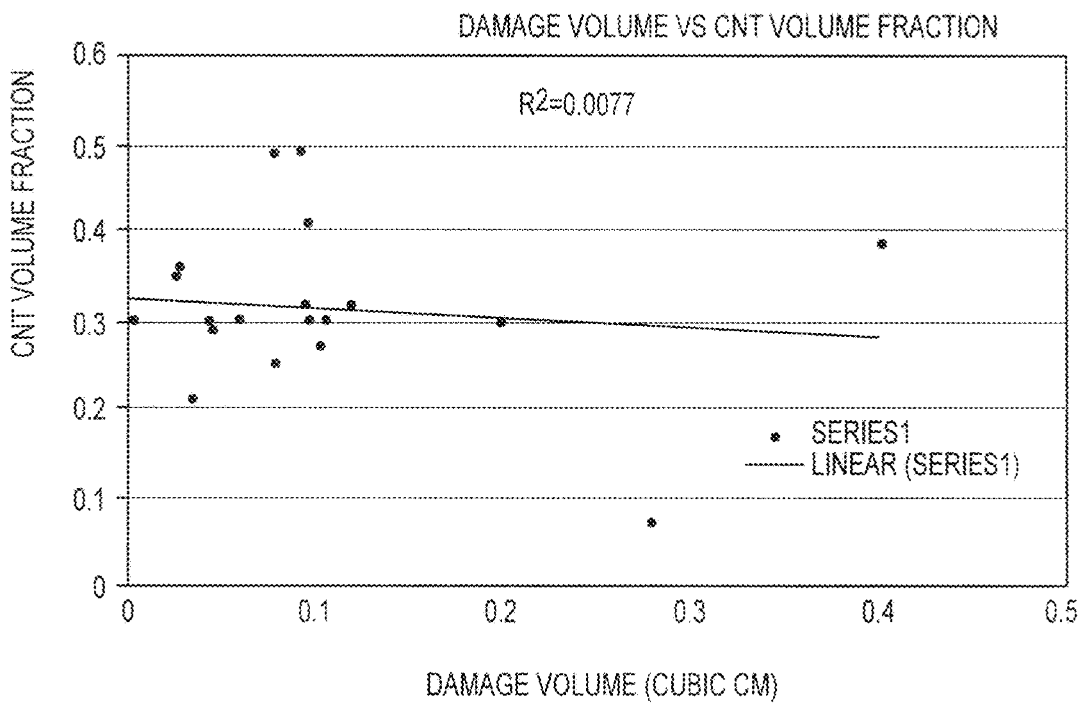
FIG. 2 illustrates a graph of the weight fraction of CNTs versus resulting damage from test lighting strikes in accordance with various embodiments.

Referring to FIG. 2, a graph of the weight fraction of CNTs versus the volume of resulting damage from test lightning strikes is illustrated according to various embodiments. The surface area of damage and the maximum damage depth was measured to determine a volume damage for a 30 kA test lightning strike. The weight fraction of CNTs varied from 7% to 45% in 19 sample composites, with the majority of weight fractions being between 20% and 40%. As illustrated by the graph, the R-squared value (with a value of 1.000 being a perfect correlation, and a value of 0.000 being zero correlation) was 0.0077. Thus, there was very little correlation between the total weight fraction of CNTs and the amount of resulting damage from a lightning strike. This indicates that simply adding more or larger CNTs to the composite without regard for the location of CNTs with respect to a tow may be inadequate in constructing efficient protective composites.

Figure 3:
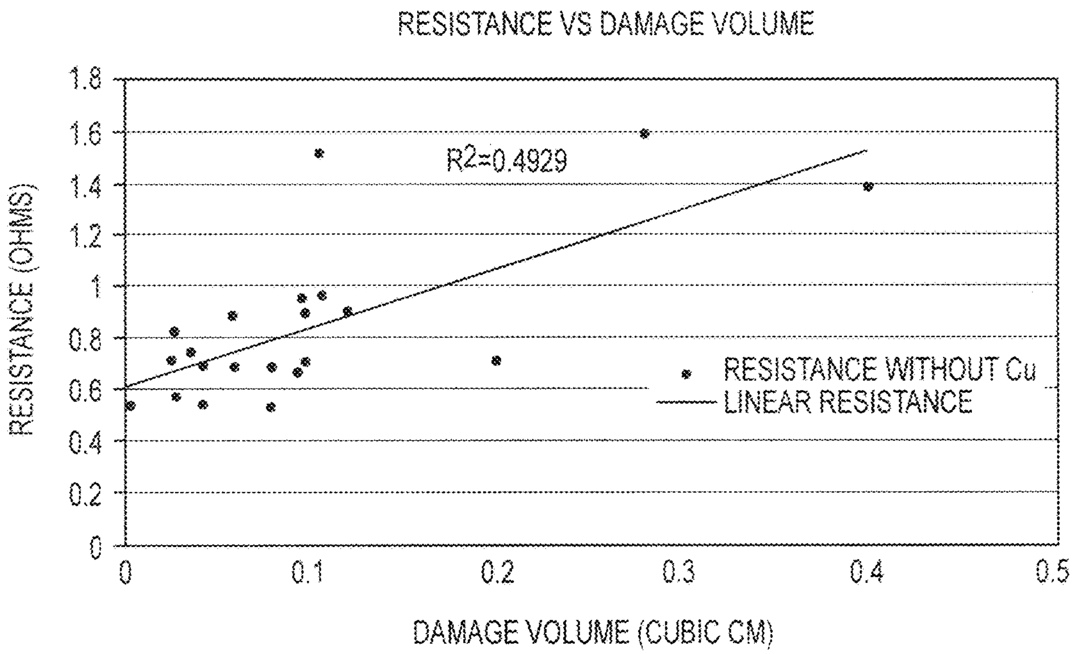
FIG. 3 illustrates a graph of the surface resistance versus resulting damage from test lighting strikes in accordance with various embodiments.

Referring to FIG. 3, a graph of the surface resistance versus resulting damage from test lighting strikes is illustrated according to various embodiments. The surface resistance varied from 0.5 Ohms/square to 1.6 Ohms/square in the sample composites. As illustrated by the graph, the R-squared value was 0.4929. Thus, there was a moderate correlation between the surface resistance and the amount of resulting damage.

Figure 4:
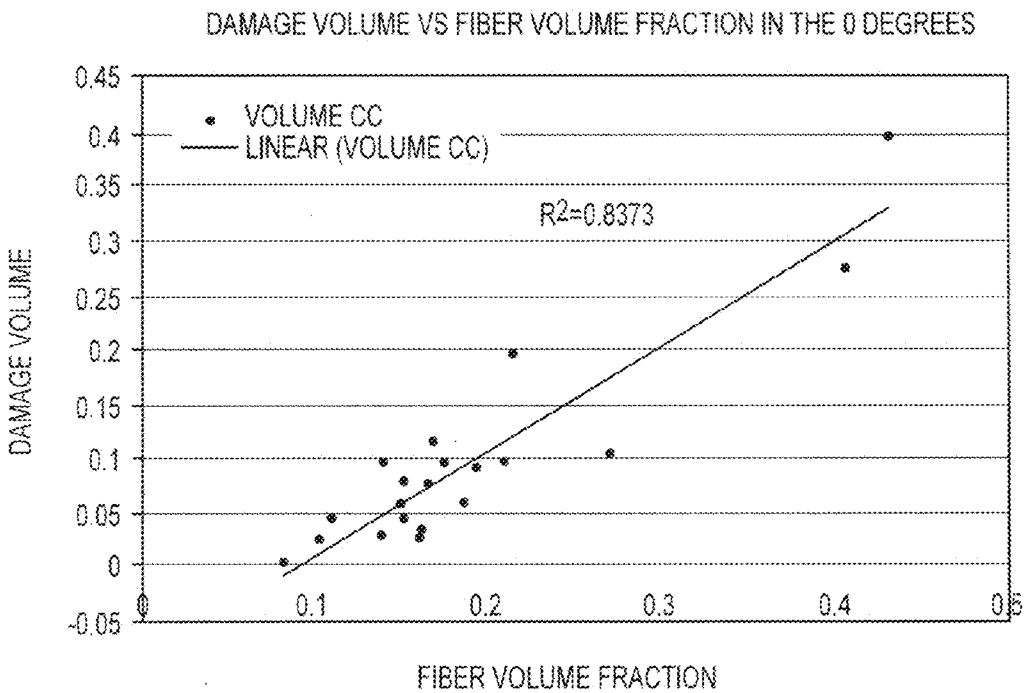
FIG. 4 illustrates a graph of the tow fiber volume fraction versus resulting damage from test lighting strikes in accordance with various embodiments.

Referring to FIG. 4, a graph of the tow fiber volume fraction versus resulting damage from test lighting strikes is illustrated according to various embodiments. The tow fiber volume fraction varied from 0.08 to 0.44 in the sample composites. As illustrated by the graph, the R-squared value was 0.8373. Thus, there was significant correlation between the tow fiber volume fraction and the amount of resulting damage. This correlation was greater than the correlation for the surface resistance or CNT weight percentage.

Figure 5:
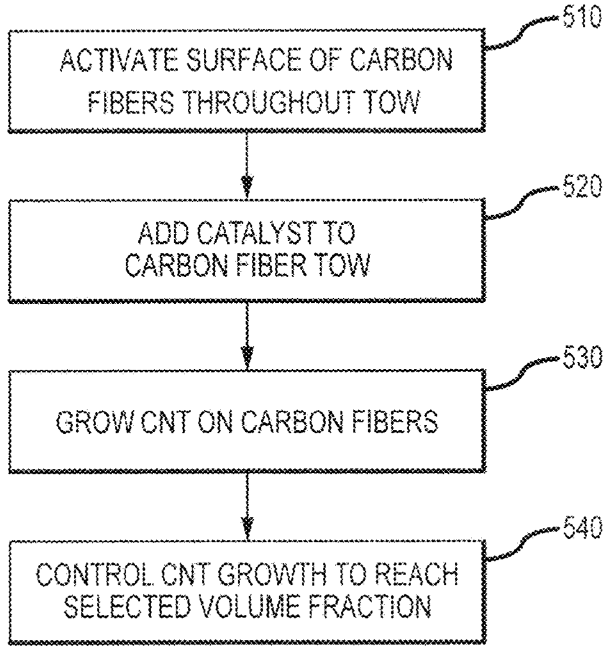
FIG. 5 illustrates a flowchart of a process for manufacturing a composite in accordance with various embodiments.

Referring to FIG. 5, a method for manufacturing a composite material is illustrated according to various embodiments. In various embodiments, the method may comprise activating the surfaces of carbon fibers in a carbon fiber tow (step 510). In various embodiments, the interior carbon fibers (i.e. the carbon fibers not located at the surface of the carbon fiber tow) may be activated. In various embodiments, the activation of the surfaces may involve oxidizing the fibers to create small imperfections on the fiber surface, such as a pit or a crevice, on all (interior and exterior) fibers within the tow. Alternatively or in addition, the carbon fiber surfaces may be chemically treated to create these imperfections. In various embodiments, the method may comprise adding a catalyst to the carbon fiber tow (step 520), such that the imperfections serve as preferential sites for the catalysts to be attached to the carbon fiber surfaces. In various embodiments, the adding the catalyst may be performed by at least one of chemical vapor deposition, solution-precipitation, electrodeposition and submersing the carbon fiber tow in a catalyst solution. In various embodiments, the method may include growing carbon nanotubes on the carbon fibers in the carbon fiber tow (step 530). In various embodiments, the carbon nanotubes may be uniformly grown on the carbon fibers, such that the carbon nanotubes are located on both an external surface of the carbon fibers on the outer surface of the tow and on external surfaces of the carbon fibers within the tow.

In various embodiments, the growth of the carbon nanotubes may be controlled to reach a selected tow fiber volume fraction of the carbon tow (step 540). In various embodiments, a tow fiber volume fraction may be decreased using more aggressive activation of the fiber surfaces to create more sites for CNT growth. Aggressive treatment of the surfaces may create a greater number of sites for catalyst seeding in the fiber tow. Aggressive activation may involve heat-treatment of the carbon fibers, oxidation of the fiber surfaces or chemical treatment, such as with acid.

The substrates described above can be incorporated into or attached to substantially any type of structure requiring lightning strike protection and/or structural reinforcement. For example, such films can be incorporated into or attached to an aircraft engine nacelle, fuselage, wing or vertical tail, a helicopter rotor blade or other helicopter component, or components or portions of such structures. Additionally, they can be incorporated into or attached to other structures such as wind turbine blades and their support structures. Other uses will be apparent to those skilled in the art.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

What is claimed is:

1. A method of manufacturing a lightning strike protection film, the method comprising:
- growing carbon nanotubes on a plurality of fibers in an intratow region within a fiber tow, wherein at least a portion of the carbon nanotubes comprise:
  - a first end coupled to a fiber of the plurality of fibers, and
  - a second end extending away from the fiber; and
- controlling a growth of the carbon nanotubes to reach a selected tow fiber volume fraction of between 10% to 20% that is uniform throughout the fiber tow.

2. The method of claim 1, further comprising separating the plurality of fibers using contact between carbon nanotubes on adjacent fibers.

3. The method of claim 1, wherein the controlling the growth comprises uniformly distributing growth sites of the carbon nanotubes on the plurality of fibers.

4. The method of claim 1, wherein the carbon nanotubes are configured to transmit electrical or thermal energy from a lightning strike.

5. The method of claim 1, wherein the controlling the growth comprises modifying surfaces of interior fibers of the plurality of fibers to seed growth of the carbon nanotubes throughout the fiber tow.

6. A method of manufacturing a composite material, the method comprising:
- growing carbon nanotubes on a plurality of fibers in a fiber tow, wherein at least a portion of the carbon nanotubes comprise a first end coupled to a fiber of the plurality of fibers and a second end extending away from the fiber; and
- controlling a growth of the carbon nanotubes to reach a selected tow fiber volume fraction of less than 45%, wherein the controlling the growth of the carbon nanotubes comprises:
  - activating surfaces of the plurality of fibers, prior to growing the carbon nanotubes, to create imperfections on the surfaces of the plurality of fibers.

7. The method of claim 6, wherein the activating the surfaces of the plurality of fibers comprises heat treating the plurality of fibers.

8. The method of claim 6, wherein the activating the surfaces of the plurality of fibers comprises oxidizing the plurality of fibers.

9. The method of claim 6, wherein the activating the surfaces of the plurality of fibers comprises chemically treating the plurality of fibers.

10. The method of claim 6, wherein the controlling the growth of the carbon nanotubes further comprises adding a catalyst to the fiber tow.

11. The method of claim 6, wherein the selected tow fiber volume fraction is between 10% and 20%.

12. The method of claim 11, further comprising attaching the composite material to a structure for lightning strike protection.

13. The method of claim 12, wherein the structure comprises at least one of an aircraft structure, a helicopter structure, or a wind turbine structure.

* * * * *